US008751891B2

(12) United States Patent
Park et al.

(10) Patent No.: US 8,751,891 B2
(45) Date of Patent: Jun. 10, 2014

(54) APPARATUS AND METHOD FOR RETRANSMITTING DATA IN WIRELESS COMMUNICATION SYSTEM

(75) Inventors: Jae-Hong Park, Gyeonggi-do (KR); Seung-Hyun Lee, Seoul (KR); Jin-Young Oh, Gyeonggi-do (KR); Dong-Jun Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 728 days.

(21) Appl. No.: 12/857,162

(22) Filed: Aug. 16, 2010

(65) Prior Publication Data

US 2011/0041022 A1   Feb. 17, 2011

(30) Foreign Application Priority Data

Aug. 14, 2009   (KR) .................. 10-2009-0074945

(51) Int. Cl.
*G06F 11/00* (2006.01)
(52) U.S. Cl.
USPC ........................................ 714/749
(58) Field of Classification Search
USPC .............................. 714/748, 749
See application file for complete search history.

(56) References Cited

U.S. PATENT DOCUMENTS

| 7,979,767 | B2 * | 7/2011 | Schaap et al. ................ 714/748 |
| 8,051,353 | B2 * | 11/2011 | Maas et al. .................. 714/748 |
| 8,266,491 | B2 * | 9/2012 | Lee et al. .................... 714/749 |
| 8,300,663 | B2 * | 10/2012 | Chion et al. ................. 370/474 |
| 2005/0058154 | A1 * | 3/2005 | Lee et al. .................... 370/473 |
| 2006/0156165 | A1 * | 7/2006 | Kim ............................ 714/749 |
| 2007/0300120 | A1 * | 12/2007 | Kim et al. ................... 714/749 |
| 2008/0109693 | A1 * | 5/2008 | Maas et al. .................. 714/748 |
| 2008/0137689 | A1 * | 6/2008 | Shiizaki et al. .............. 370/498 |
| 2009/0181689 | A1 * | 7/2009 | Lee et al. ..................... 455/450 |
| 2009/0203323 | A1 * | 8/2009 | Ratasuk et al. ............... 455/68 |
| 2011/0013613 | A1 * | 1/2011 | Sung et al. ................... 370/338 |
| 2011/0128893 | A1 * | 6/2011 | Park et al. ................... 370/279 |
| 2012/0051329 | A1 * | 3/2012 | Hirano et al. ................ 370/332 |

\* cited by examiner

*Primary Examiner* — Bryce Bonzo
*Assistant Examiner* — Elmira Mehrmanesh
(74) *Attorney, Agent, or Firm* — The Farrell Law Firm, P.C.

(57) ABSTRACT

An apparatus and a method for operating an Automatic Repeat reQuest (ARQ) in consideration of an operation state of a Hybrid Automatic Repeat reQuest (HARQ) in a wireless communication system. In the method, when an ARQ timer expires, operation state information of a HARQ module for controlling a HARQ is determined. Whether to delay generation of Negative ACKnowledge (NACK) information in consideration of the operation state information of the HARQ module, then determined. When determining to delay the generation of the NACK information, the generation of the NACK information is delayed for a delay time determined in consideration of the operation state information of the HARQ module.

18 Claims, 8 Drawing Sheets

APPARATUS AND METHOD FOR RETRANSMITTING DATA IN WIRELESS COMMUNICATION SYSTEM

PRIORITY

This application claims priority under 35 U.S.C. §119(a) to a Korean patent application filed in the Korean Intellectual Property Office on Aug. 14, 2009 and assigned Serial No. 10-2009-0074945, the entire disclosure of which is hereby incorporated by reference.

BACKGROUND OF THE INVENTION

1. Field of the Invention

The present invention relates generally to an apparatus and a method for retransmitting data in a wireless communication system, and more particularly, to an apparatus and a method for operating an Automatic Repeat reQuest (ARQ) using operation state information of a Hybrid Automatic Repeat reQuest (HARQ).

2. Description of the Related Art

In a wireless communication system, an error may be generated for transmission data depending on a channel state of a radio resource that transmits data. In this case, the wireless communication system performs control and recovery on a data error using an ARQ technique in order to raise transmission reliability.

When using the ARQ technique, a reception end informs a transmission end of whether data received from the transmission end is successfully received. For example, when an error is not generated for data received from the transmission end, the reception end transmits ACKnowledge (ACK) information to the transmission end. In contrast, when an error is generated for data received from the transmission end, the reception end transmits Negative ACK (NACK) information to the transmission end.

The transmission end retransmits data depending on the ACK/NACK information received from the reception end. For example, when receiving ACK information from the reception end, the transmission end recognizes that the reception end has successfully received data. Accordingly, the transmission end transmits new data to the reception end. In contrast, after receiving NACK information from the reception end, the transmission end recognizes that an error has been generated for data corresponding to the NACK information. Accordingly, the transmission end retransmits original data of the data corresponding to the NACK information to the reception end.

A wireless communication system may additionally use HARQ to perform high speed data transmission. For example, the reception end may perform high speed data transmission by performing, at a HARQ module, retransmission before an ARQ module requests retransmission.

FIG. 1 illustrates a conventional procedure for transmitting data in a wireless communication system.

As illustrated in FIG. 1, a transmission end 100 transmits data 1 to a reception end 110 via an ARQ module 102 and a HARQ module 104 in steps 121 and 123.

A HARQ module 112 of the reception end 110 determines whether an error is generated for the data 1. If an error is generated for the data 1, the HARQ module 112 transmits HARQ NACK information for the data 1 to the HARQ module 104 of the transmission end 100.

In contrast, when an error is not generated for the data 1, the HARQ module 112 transmits HARQ ACK information for the data 1 to the HARQ module 104 of the transmission end 100 in step 125. In addition, the HARQ module 112 transmits the data 1 to an ARQ module 114 in step 127.

The transmission end 100 transmits data 2 to the reception end 110 via the ARQ module 102 and the HARQ module 104 in steps 129 and 131.

The HARQ module 112 of the reception end 110 determines whether an error is generated for the data 2. If an error is generated for the data 2, the HARQ module 112 transmits HARQ NACK information for the data 2 to the HARQ module 104.

However, if an error is not generated for the data 2, the HARQ module 112 transmits HARQ ACK information for the data 2 to the HARQ module 104 of the transmission end 100 in step 133. In addition, the HARQ module 112 transmits the data 2 to the ARQ module 114 in step 135.

The transmission end 100 transmits data 3 to the reception end 110 via the ARQ module 102 and the HARQ module 104 in steps 137 and 139.

The HARQ module 112 of the reception end 110 determines whether an error is generated for the data 3. If an error is generated for the data 3, the HARQ module 112 transmits HARQ NACK information for the data 3 to the HARQ module 104 in step 141.

The HARQ module 104 of the transmission end 100 retransmits the data 3 to the HARQ module 112 of the reception end 110 depending on the HARQ NACK information for the data 3 in step 143.

The HARQ module 112 of the reception end 110 determines whether an error is generated for the retransmitted data 3. If an error is generated for the retransmitted data 3, the HARQ module 112 transmits HARQ NACK information for the retransmitted data 3 to the HARQ module 104 of the transmission end 100 in step 145.

The HARQ module 104 of the transmission end 100 and the HARQ module 112 of the reception end 110 perform retransmission of the data 3 until the HARQ module 112 of the reception end 110 receives the data 3 without an error in steps 147 to 155. However, the HARQ modules 104 and 112 perform retransmission of the relevant data by only a predetermined number of times.

The HARQ module 112 of the reception end 110 determines whether an error is generated for the retransmitted data 3. If an error is not generated to the data 3, the HARQ module 112 transmits HARQ ACK information for the data 3 to the HARQ module 104 of the transmission end 100 in step 157. In addition, the HARQ module 112 transmits the data 3 to the ARQ module 114 in step 159.

As described above, a wireless communication system may provide a high speed data service through a fast retransmission request using the HARQ technique. However, when a radio channel state deteriorates and retransmission of a HARQ frequently occurs, the ARQ module 114 of the reception end 110 may doubly receive data.

For example, as illustrated in FIG. 1, the ARQ module 114 of the reception end 110 receives data 3 through HARQ retransmission in step 159. However, when an ARQ timer of the ARQ module 114 expires while the HARQ module 104 and the HARQ module 112 perform retransmission of data 3 in step 151, the ARQ module 114 transmits ARQ NACK information for the data 3 to the ARQ module 102 of the transmission end 100 in step 153. Consequently, the ARQ module 102 of the transmission end 100 retransmits the data 3 to the HARQ module 104 based on ARQ NACK information for the data 3 in step 161. The HARQ module 104 recognizes the data 3 provided from the ARQ module 102 as data 4 to transmit the same to the reception end 110 in step 163.

The HARQ module 112 of the reception end 110 determines whether an error is generated to the data 3 provided from the HARQ module 104. If an error is not generated to the data 3, the HARQ module 112 transmits HARQ ACK information for the data 3 to the HARQ module 104 of the transmission end 100 in step 165. In addition, the HARQ module 112 transmits the data 3 to the ARQ module 114 in step 167.

As described above, the ARQ module 114 of the reception end 110 unnecessarily receives the data 3 twice, through the HARQ retransmission and the ARQ retransmission, deteriorating throughput and wasting resources.

SUMMARY OF THE INVENTION

The present invention is designed to address at least the above-mentioned problems and/or disadvantages and to provide at least the advantages described below.

Accordingly, an aspect of the present invention is to provide an apparatus and a method for using both an ARQ technique and a HARQ technique in a wireless communication system.

Another aspect of the present invention is to provide an apparatus and a method for operating an ARQ in consideration of an operation state of a HARQ in a wireless communication system.

Another aspect of the present invention is to provide an apparatus and a method for operating an ARQ in consideration of a frequency of HARQ retransmission in a wireless communication system.

Another aspect of the present invention is to provide an apparatus and a method for operating an ARQ in consideration of an amount of data stored in a HARQ queue in a wireless communication system.

Another aspect of the present invention is to provide an apparatus and a method for operating an ARQ in consideration of a driving time of a timer that is driven when an error is generated for reception data at a HARQ module of a reception end in a wireless communication system.

Another aspect of the present invention is to provide an apparatus and a method for delaying generation of ARQ NACK information in consideration of an operation state of a HARQ in a wireless communication system.

In accordance with an aspect of the present invention, a method for operating an Automatic Repeat reQuest (ARQ) at a reception end of a wireless communication system is provided. The method includes determining Hybrid Automatic Repeat reQuest (HARQ) operation state information, when an ARQ timer expires, determining whether to update a driving time of the ARQ timer in consideration of the HARQ operation state information; and when determining to update the driving time of the ARQ timer, updating the driving time of the ARQ timer so that the ARQ timer does not expire in consideration of a NACK information transmission frequency for a HARQ included in the HARQ operation state information.

In accordance with another aspect of the present invention, a reception end apparatus for operating an Automatic Repeat reQuest (ARQ) in a wireless communication system is provided. The apparatus includes a receiver for receiving data; a Hybrid Automatic Repeat reQuest (HARQ) module for controlling a HARQ for data received via the receiver; an ARQ timer that is driven when an ARQ module transmits ACK/NACK information; and the ARQ module for determining whether to delay generation of NACK information, when the ARQ timer expires, in consideration of operation state information of the HARQ module, and when determining to delay the generation of the NACK information, delaying the generation of the NACK information for a delay time determined in consideration of the operation state information of the HARQ module even when the ARQ timer expires.

BRIEF DESCRIPTION OF THE DRAWINGS

The above and other aspects, features, and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of certain embodiments of the present invention, and includes various specific details to assist in that understanding. However, these specific details are to be regarded as merely exemplary. Accordingly, those of ordinary skill in the art will recognize that various changes and modifications of the embodiments described herein can be made without departing from the scope and spirit of the present invention. Additionally, descriptions of well-known functions and constructions are omitted for clarity and conciseness.

Certain embodiments of the present invention provide techniques for controlling an operation of an ARQ in consideration of an operation state of a HARQ in a wireless communication system.

In the following description, ACK/NACK information of an ARQ module is referred to as ARQ ACK/NACK information, and ACK/NACK information of an HARQ module is referred to as HARQ ACK/NACK information.

Figure 1:
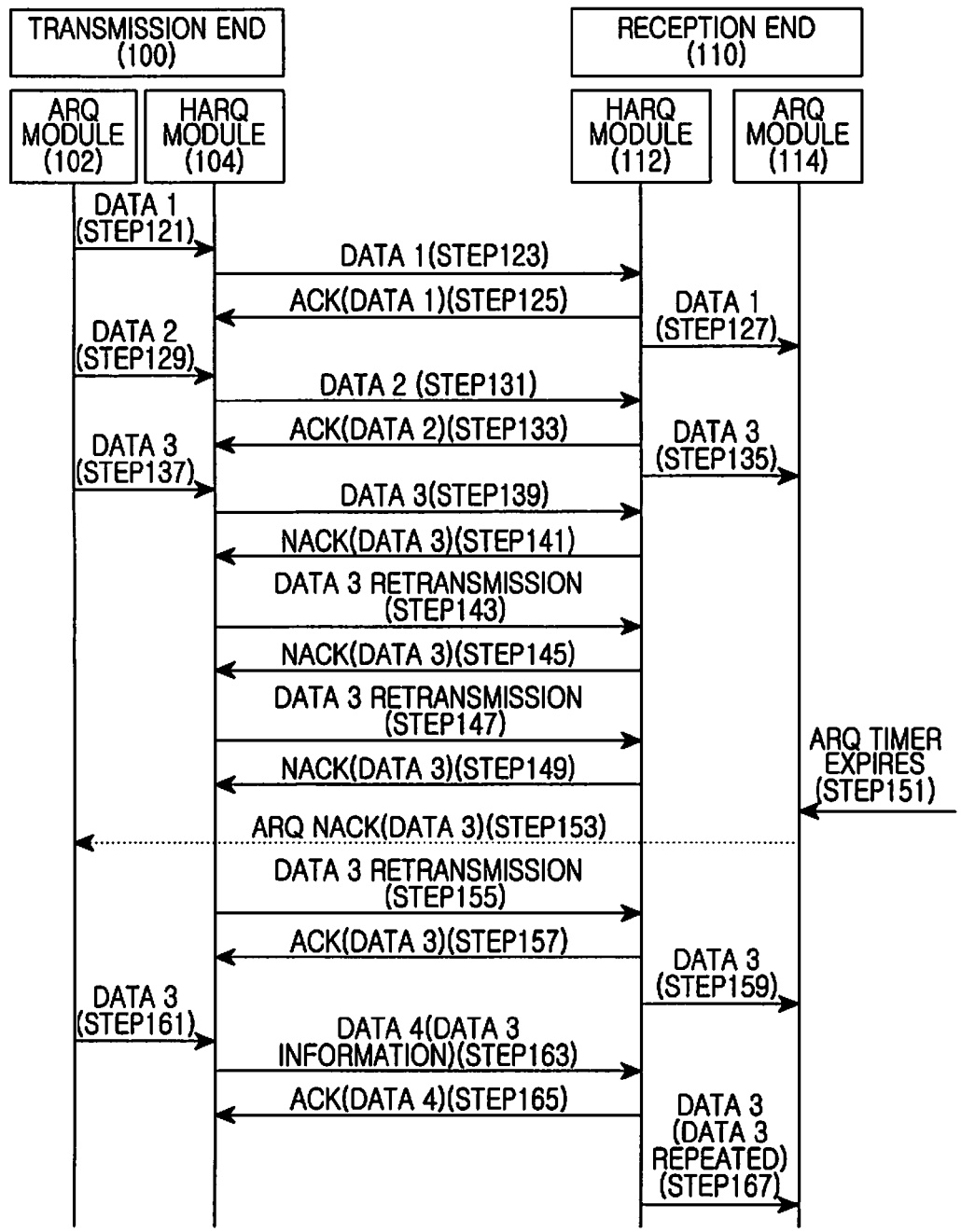
FIG. 1 illustrates a conventional procedure for retransmitting data in a wireless communication system.
Figure 2:
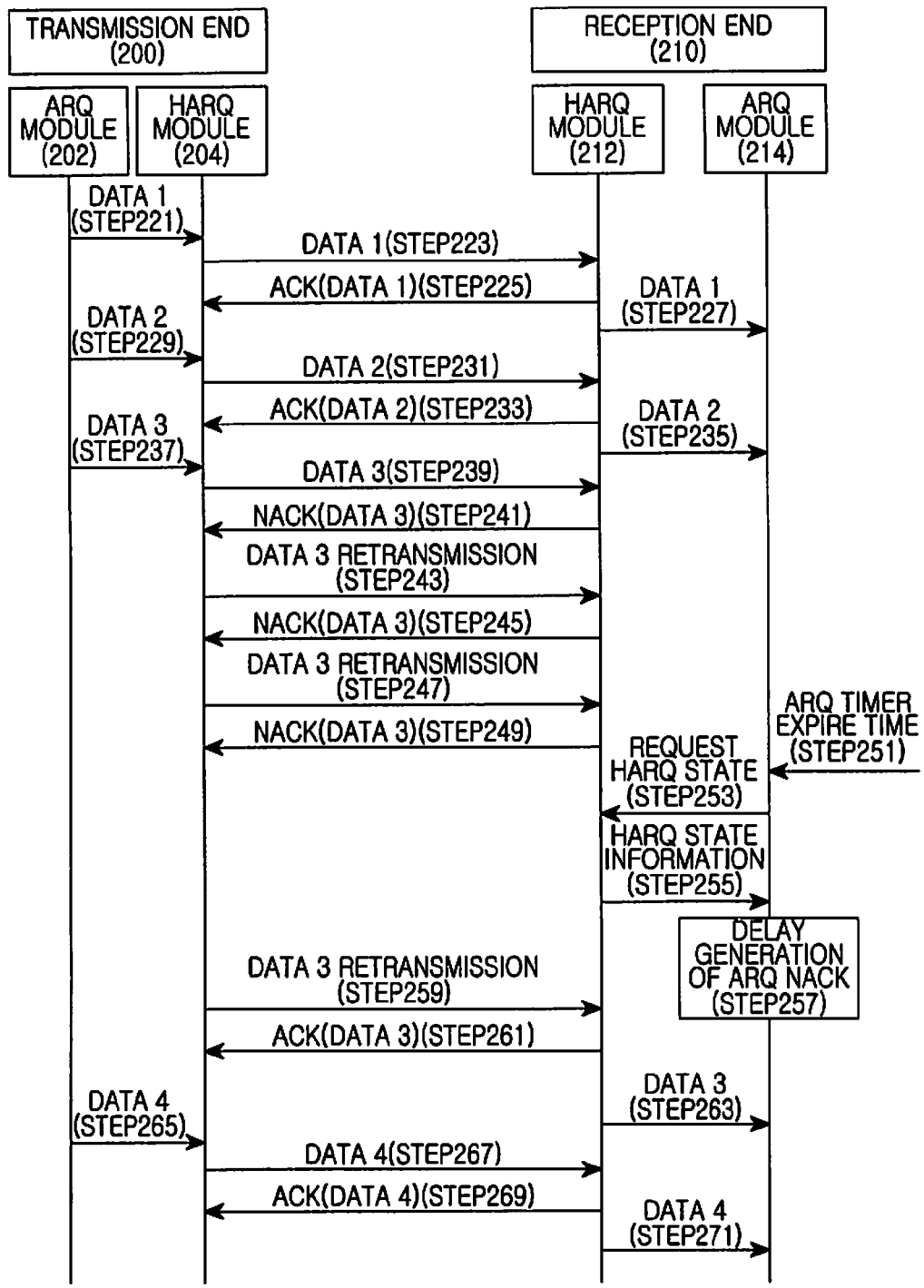
FIG. 2 illustrates a procedure for retransmitting data in a wireless communication system according to an embodiment of the present invention.

FIG. 2 is a diagram illustrating a procedure for retransmitting data in a wireless communication system according to an embodiment of the present invention.

Referring to FIG. 2, a transmission end 200 transmits data 1 to a reception end 210 via an ARQ module 202 and a HARQ module 204 in steps 221 and 223.

An HARQ module 212 of the reception end 210 determines whether an error is generated for the data 1. If an error is generated to the data 1, the HARQ module 212 transmits HARQ NACK information for the data 1 to the HARQ module 204 of the transmission end 200 in order to request retransmission of the data 1. However, when an error is not generated for the data 1, the HARQ module 212 transmits HARQ ACK information for the data 1 to the HARQ module 204 of the transmission end 200 in step 225. In addition, the HARQ module 212 transmits the data 1 to an ARQ module 214 in step 227.

The transmission end 200 transmits data 2 to the reception end 210 via the ARQ module 202 and the HARQ module 204 in steps 229 and 231.

The HARQ module 212 of the reception end 210 determines whether an error is generated for the data 2. If an error is generated to the data 2, the HARQ module 212 transmits HARQ NACK information for the data 2 to the HARQ module 204 of the transmission end 200 in order to request retransmission of the data 2. However, if an error is not generated for the data 2, the HARQ module 212 transmits HARQ ACK information for the data 2 to the HARQ module 204 of the transmission end 200 in step 233. In addition, the HARQ module 212 transmits the data 2 to the ARQ module 214 in step 235.

In steps 237 and 239, the transmission end 200 transmits data 3 to the reception end 220 via the ARQ module 202 and the HARQ module 204.

The HARQ module 212 of the reception end 210 determines whether an error is generated for the data 3. If an error is generated for the data 3, the HARQ module 212 transmits HARQ NACK information for the data 3 to the HARQ module 204 of the transmission end 200 in order to request retransmission of the data 3 in step 241.

The HARQ module 204 of the transmission end 200 retransmits the data 3 to the HARQ module 212 of the reception end 210 depending on HARQ NACK information for the data 3 in step 243. That is, the HARQ module 204 retransmits the data 3 in consideration of a retransmission frequency for the data 3.

The HARQ module 212 of the reception end 210 determines whether an error is generated for the data 3. If an error is generated for the data 3, in step 245, the HARQ module 212 transmits HARQ NACK information for the data 3 to the HARQ module 204 of the transmission end 200 in order to request retransmission of the data 3.

In step 247, the HARQ module 204 of the transmission end 200 retransmits the data 3 to the HARQ module 212 of the reception end 210 based on HARQ NACK information for the data 3. Specifically, the HARQ module 204 retransmits the data 3 in consideration of a retransmission frequency for the data 3.

The HARQ module 212 of the reception end 210 determines whether an error is generated for the data 3. If an error is generated to the data 3, in step 249, the HARQ module 212 transmits HARQ NACK information for the data 3 to the HARQ module 204 of the transmission end 200 in order to request retransmission of the data 3.

When an ARQ timer of the ARQ module 214 expires while the HARQ module 204 and the HARQ module 212 perform retransmission of the data 3 in step 251, the ARQ module 214 requests operation state information of the HARQ module 212 in step 253.

In step 255, the HARQ module 212 transmits its operation state information to the ARQ module 214. Here, the operation state information includes at least one of a retransmission frequency of relevant data, an amount of data stored in a buffer of the HARQ module 212, and a driving time of a timer T1. The buffer includes a re-ordering queue. The timer T1 denotes a timer driven when the HARQ module 212 receives data of a not in-sequence Transport Sequence Number (TSN). That is, the timer T1 is driven when data of an unexpected sequence number is received. For example, when the HARQ module 212 is scheduled to receive data having a sequence of 1, 2, 3, 4, and 5, but data having a sequence of 1, 2, 4, and 5 are actually received, the timer T1 is driven by reception of data having a sequence of 4.

The ARQ module 214 controls an operation of an ARQ in consideration of operation state information of the HARQ module 212. For example, the ARQ module 214 determines whether data 3 is receivable through HARQ retransmission in consideration of the operation state information of the HARQ module 212. When determining that the data 3 is not receivable through HARQ retransmission, the ARQ module 214 generates ARQ NACK information. However, when determining that the data 3 is receivable through HARQ retransmission, in step 257, the ARQ module 214 delays generation of ARQ NACK information for a reference time, even when the ARQ timer expires. The reference time is determined in consideration of a HARQ NACK information generation frequency.

In response to the HARQ NACK information of the data 3 in step 249, the HARQ module 204 of the transmission end 200 retransmits the data 3 to the HARQ module 212 of the reception end 210 in step 259. The HARQ module 204 retransmits the data 3 in consideration of a retransmission frequency for the data 3.

The HARQ module 212 of the reception end 210 determines whether an error is generated for the data 3. If an error is not generated for the data 3, the HARQ module 212 transmits HARQ ACK information for the data 3 to the HARQ module 204 of the transmission end 200 in step 261. Additionally, the HARQ module 212 transmits the data 3 to the ARQ module 214 in step 263.

In steps 265 and 267, the transmission end 200 transmits data 4 to the reception end 210 via the ARQ module 202 and the HARQ module 204

The HARQ module 212 of the reception end 210 determines whether an error is generated for the data 4. If an error is generated for the data 4, in order to request retransmission of the data 4, the HARQ module 212 transmits HARQ NACK information for the data 4 to the HARQ module 204 of the transmission end 200. However, if an error is not generated for the data 4, as illustrated in FIG. 2, the HARQ module 212 transmits HARQ ACK information for the data 4 to the HARQ module 204 of the transmission end 200 in step 269. In addition, the HARQ module 212 transmits the data 4 to the ARQ module 214 in step 271.

Figure 3:
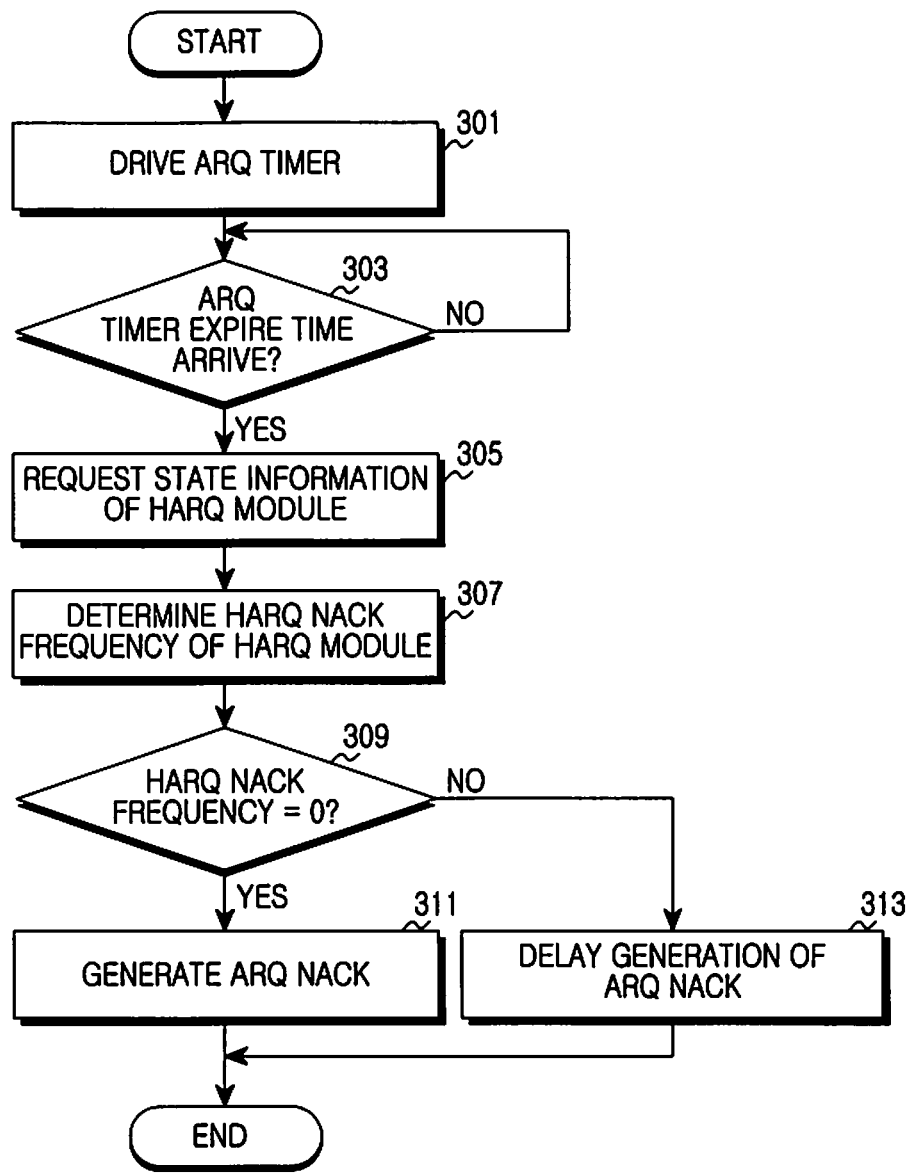
FIG. 3 is a flowchart illustrating a procedure for requesting retransmission of data at an ARQ module of a reception end according to an embodiment of the present invention.

FIG. 3 is a flowchart illustrating a procedure for requesting retransmission of data at an ARQ module of a reception end according to an embodiment of the present invention.

Referring to FIG. 3, when transmitting ARQ ACK/NACK information, the ARQ module of the reception end drives an ARQ timer in step 301. Here, the ARQ timer denotes an interval by which the ARQ module generates ARQ NACK information. Accordingly, the ARQ module drives the ARQ timer when transmitting ARQ ACK/NACK information.

The ARQ module determines whether the ARQ timer expires in step 303.

When the ARQ timer expires, the ARQ module requests a HARQ module of the reception end to transmit operation state information in step 305.

The ARQ module determines a data retransmission frequency of the HARQ module from operation state information provided by the HARQ module in step 307. For example, the ARQ module determines a frequency by which the HARQ module has transmitted HARQ NACK information to a transmission end. After determining the HARQ NACK frequency of the HARQ module, the ARQ module determines whether the HARQ module has performed retransmission of data in step 309.

When the frequency by which the HARQ module has transmitted HARQ NACK information is 0, the ARQ module determines that the HARQ module has not performed retransmission of data. That is, when the ARQ timer expires, the ARQ module determines that data has not been received due to a problem of the ARQ module, not a problem of the HARQ module. Accordingly, the ARQ module generates ARQ NACK information in step 311.

However, when the frequency by which the HARQ module has transmitted HARQ NACK information is not 0, the ARQ module determines that the HARQ module is already performing HARQ retransmission. That is, the ARQ module determines that it may still receive data through HARQ retransmission. Accordingly, the ARQ module delays generation of ARQ NACK information, even when the ARQ timer expires in step 313.

For example, the ARQ module determines a time for delaying generation of ARQ NACK information in consideration of a frequency by which the HARQ module has transmitted HARQ NACK information. Alternatively, the ARQ module may determine a time for delaying the generation of the ARQ NACK information in consideration of a driving time of a timer T1 of the HARQ module.

As described above, the ARQ module controls an ARQ operation in consideration of a HARQ NACK information transmission frequency of the HARQ module. That is, the ARQ module controls the ARQ operation in consideration of a data retransmission frequency of the HARQ module.

As will be described below, the ARQ module may also control an ARQ operation in consideration of an amount of data included in a queue of the HARQ module.

Figure 4:
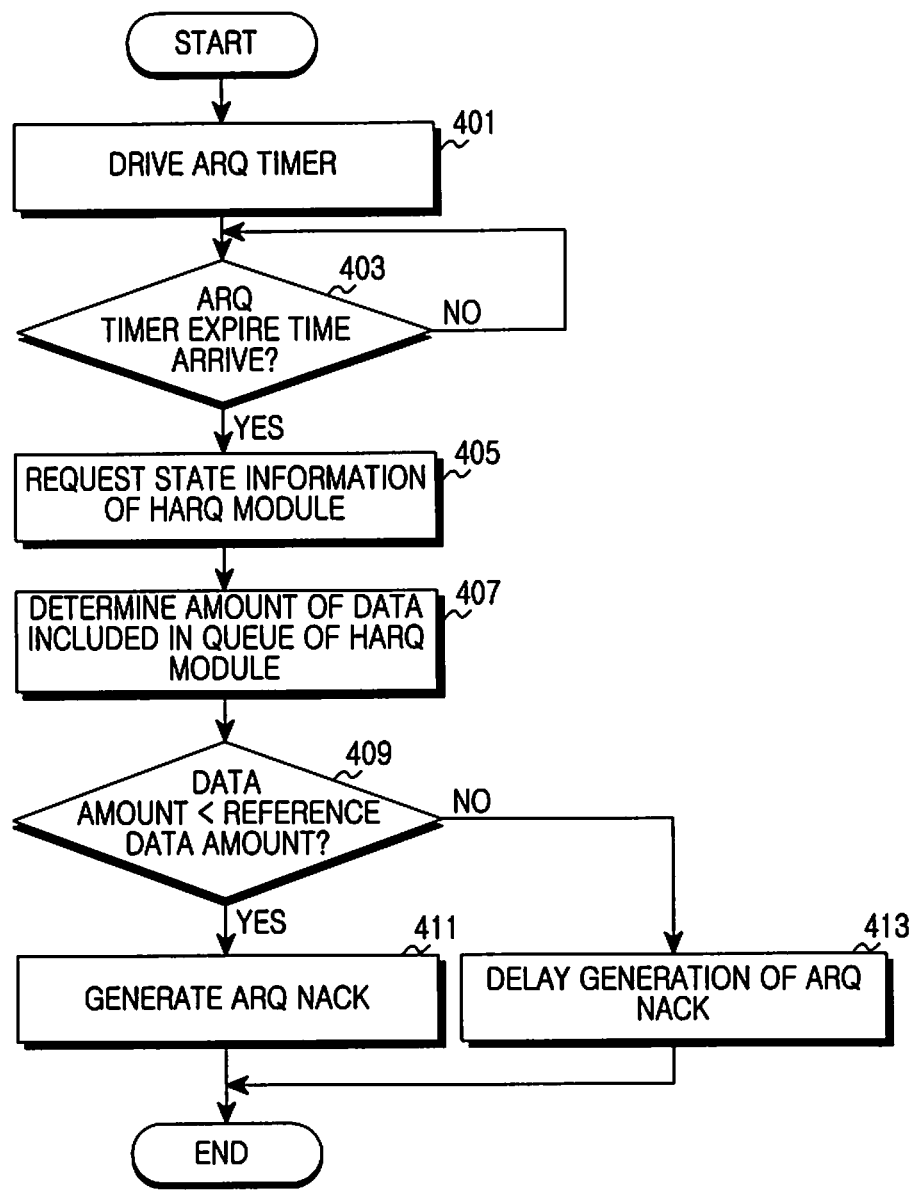
FIG. 4 is a flowchart illustrating a procedure for requesting retransmission of data at an ARQ module of a reception end according to an embodiment of the present invention.

FIG. 4 is a flowchart illustrating a procedure for requesting retransmission of data at an ARQ module of a reception end according to an embodiment of the present invention.

Referring to FIG. 4, when transmitting ARQ ACK/NACK information, the ARQ module of the reception end drives an ARQ timer in step 401. Here, the ARQ timer denotes an interval by which the ARQ module generates ARQ NACK information. Accordingly, the ARQ module drives the ARQ timer when transmitting ARQ ACK/NACK information.

The ARQ module determines whether the ARQ timer expires in step 403.

When the ARQ timer expires, the ARQ module requests the HARQ module of the reception end to transmit operation state information in step 405.

In step 407, the ARQ module determines an amount of data stored in a queue of the HARQ module from the operation state information provided by the HARQ module.

After determining the amount of the data stored in the queue of the HARQ module, the ARQ module compares the amount of the data stored in the queue with an amount of reference data in step 409. When the amount of the data stored in the queue is less than the amount of the reference data, the ARQ module determines that it cannot receive relevant data through HARQ retransmission. That is, the queue of the HARQ module is a re-ordering queue and stores data in a sequence order. Accordingly, when the data stored in the queue is less than the amount of the reference data, the ARQ module may determine that data having a sequence not received by the HARQ module exist and a probability that the HARQ module will receive the data through HARQ retransmission is low. For example, when data having a sequence of 1 and 7 are stored in the queue, the HARQ module has to receive data having a sequence of 2, 3, 4, 5, and 6 through HARQ retransmission. Therefore, if the amount of the reference data in the queue of the HARQ module is set to 1, the ARQ module determines that a probability of receiving relevant data through HARQ retransmission is low.

As described above, when the ARQ module determines that it cannot receive relevant data through HARQ retransmission, when a driving time of the ARQ timer expires and the ARQ timer expires, the ARQ module generates ARQ NACK information in step 411.

However, when the amount of the data stored in the queue is equal to or greater than the amount of the reference data in step 409, the ARQ module determines that it may receive relevant data through HARQ retransmission. That is, when the data stored in the queue is large, the ARQ module may determine that data having a sequence not received from the HARQ module exists, but that a probability that the HARQ module may still receive the data through HARQ retransmission is high. For example, when data having a sequence of 1, 2, 3, and 5 are stored in the queue, the HARQ module only has to receive data having a sequence of 4 through HARQ retransmission. If the amount of the reference data is set to 3, the ARQ module determines that a probability of receiving relevant data through only HARQ retransmission is high.

As described above, when determining that the ARQ module may receive relevant data through HARQ retransmission, in step 413, the ARQ module delays generation of ARQ NACK information, even when the ARQ timer expires.

For example, the ARQ module may determine a time for delaying the generation of the ARQ NACK information in consideration of a frequency by which the HARQ module has transmitted HARQ NACK information. Alternatively, the ARQ module may determine a time for delaying the ARQ NACK information in consideration of a driving time of a timer T1 of the HARQ module.

As described above, the ARQ module controls an ARQ operation in consideration of an amount of data included in a queue of the HARQ module.

As will be described below, the ARQ module may also control an ARQ operation in consideration of a driving time of a timer T1 of the HARQ module.

Figure 5:
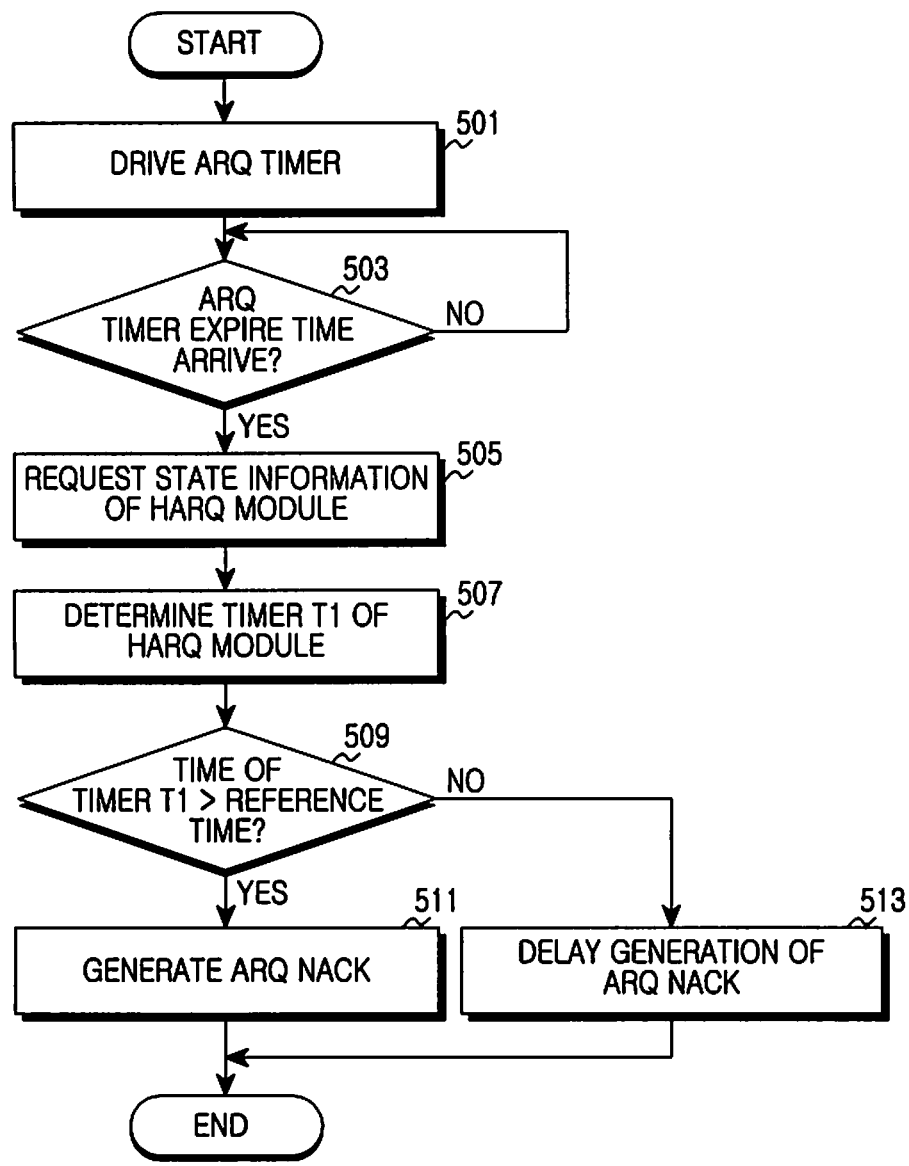
FIG. 5 is a flowchart illustrating a procedure for requesting retransmission of data at an ARQ module of a reception end according to an embodiment of the present invention.

FIG. 5 is a flowchart illustrating a procedure for requesting retransmission of data at an ARQ module of a reception end according to an embodiment of the present invention.

Referring to FIG. 5, when transmitting ARQ ACK/NACK information, the ARQ module of the reception end drives an ARQ timer in step 501. Here, the ARQ timer denotes an interval by which the ARQ module generates ARQ NACK information. Accordingly, the ARQ module drives the ARQ timer when transmitting ARQ ACK/NACK information.

The ARQ module determines whether the ARQ timer expires in step 503.

When the ARQ timer expires, the ARQ module requests a HARQ module of the reception end to transmit operation state information in step 505. In step 507, the ARQ module determines a driving time of a timer T1 of the HARQ module from the operation state information provided from the HARQ module.

After determining the driving time of the timer T1 of the HARQ module, the ARQ module compares the driving time of the timer T1 with a reference time in step 509.

When the driving time of the timer T1 is greater than the reference time, the ARQ module determines that a HARQ retransmission frequency is small, so that a probability of receiving relevant data through HARQ retransmission is low. Accordingly, when the driving time of the ARQ timer expires and the ARQ timer expires, the ARQ module generates ARQ NACK information in step 511.

However, when the driving time of the timer T1 is equal to or less than the reference time in step 509, the ARQ module determines that an HARQ retransmission frequency is large, so that a probability of receiving relevant data through HARQ retransmission is high. Accordingly, in step 513, the ARQ module delays generation of the ARQ NACK information, even when the ARQ timer expires.

For example, the ARQ module may determine a time for delaying the generation of the ARQ NACK information in consideration of a frequency by which an HARQ module has transmitted the HARQ NACK information. Alternatively, the ARQ module may determine a time for delaying the generation of the ARQ NACK information with consideration of the driving time of the timer T1 of the HARQ module.

As described above, the ARQ module controls an ARQ operation in consideration of one of a HARQ data retransmission frequency, an amount of data included in the queue of the HARQ module, and a driving time of the timer T1 of the HARQ module.

As will be described below, a ARQ module may also control an ARQ operation in consideration of both an HARQ data retransmission frequency and an amount of data included in the queue of the HARQ module.

Figure 6:
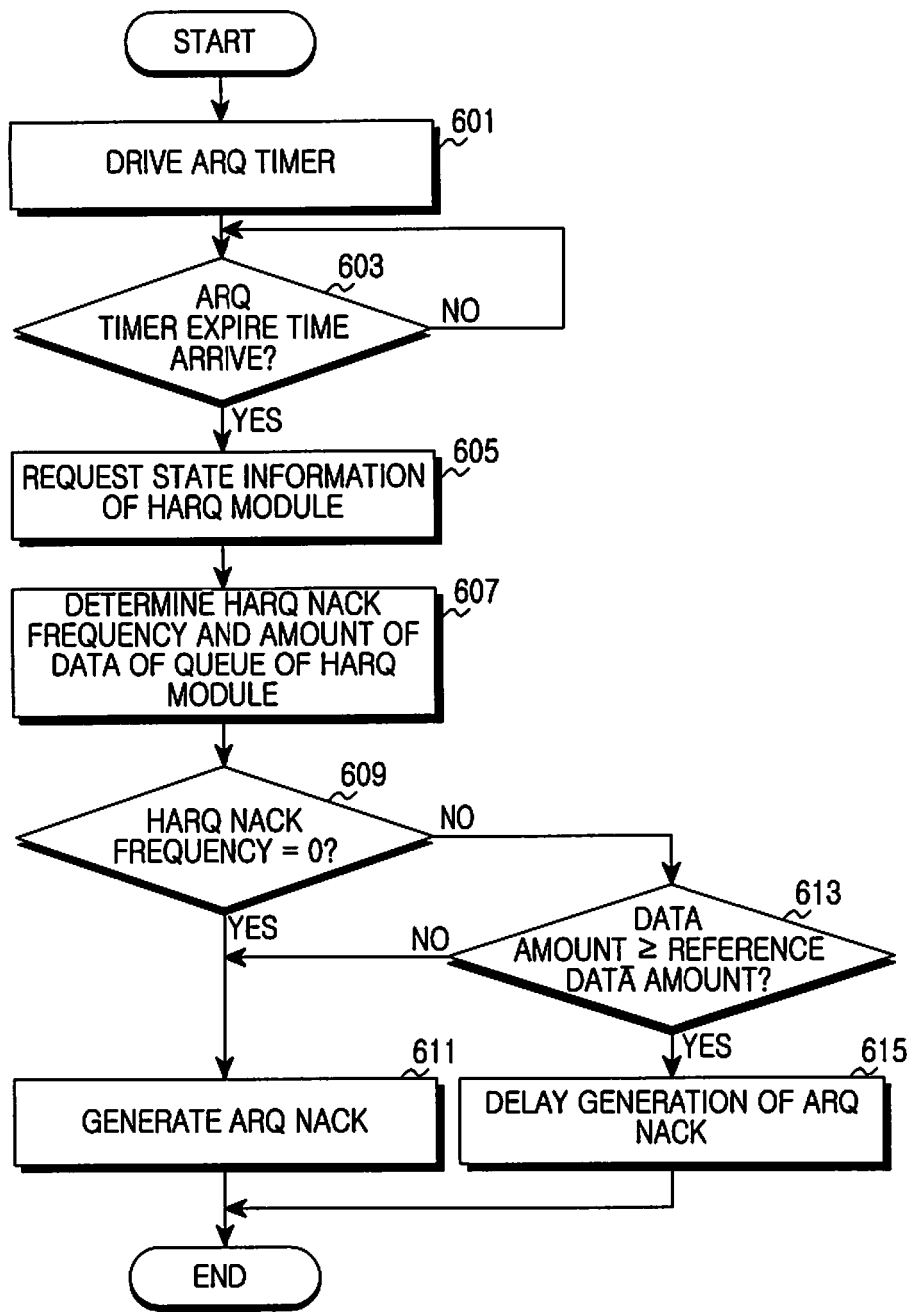
FIG. 6 is a flowchart illustrating a procedure for requesting retransmission of data at an ARQ module of a reception end according to an embodiment of the present invention.

FIG. 6 is a flowchart illustrating a procedure for requesting retransmission of data at an ARQ module of a reception end according to an embodiment of the present invention.

Referring to FIG. 6, when transmitting ARQ ACK/NACK information, the ARQ module of the reception end drives an ARQ timer in step 601.

In step 603, the ARQ module determines whether the ARQ timer expires.

When the ARQ timer expires, the ARQ module requests the HARQ module of the reception end to transmit operation state information in step 605.

In step 607, the ARQ module determines a data retransmission frequency of the HARQ module and an amount of data stored in a queue of the HARQ module from the operation state information provided from the HARQ module. Here, the ARQ module may determine the data retransmission frequency through a frequency by which the HARQ module has transmitted HARQ NACK information to a transmission end.

After determining an HARQ NACK transmission frequency of the HARQ module, the ARQ module determines whether the HARQ module has performed retransmission of data in step 609.

When the frequency by which the HARQ module has transmitted the HARQ NACK information is 0, the ARQ module determines that the HARQ module has not performed retransmission of data. That is, when the ARQ timer expires, the ARQ module determines that data has not been received due to a problem of ARQ module, not a problem of the HARQ module. Accordingly, the ARQ module generates ARQ NACK information in step 611.

However, when the frequency by which the HARQ module has transmitted the HARQ NACK information is not 0, the ARQ module compares an amount of data stored in a queue of the HARQ module with an amount of reference data in step 613.

When the amount of the data stored in the queue is less than the amount of the reference data, the ARQ module determines that a probability that it may receive relevant data through HARQ retransmission is low. Accordingly, the ARQ module generates ARQ NACK information in step 611.

However, when the amount of the data stored in the queue is equal to or greater than the amount of the reference data, the ARQ module determines that the probability that it may still receive relevant data through HARQ retransmission is high. Accordingly, in step 615, the ARQ module delays generation of ARQ NACK information, even when the ARQ timer expires.

For example, the ARQ module may determines a time for delaying the generation of the ARQ NACK information in consideration of a frequency by which the HARQ module has transmitted HARQ NACK information. Alternatively, the ARQ module may determine a time for delaying the generation of the ARQ NACK information in consideration of a driving time of a timer T1 of the HARQ module.

As described above, the ARQ module controls an ARQ operation in consideration of both an HARQ data retransmission frequency and an amount of data included in a queue of the HARQ module.

As will be described below, the ARQ module may also control an ARQ operation in consideration of both an HARQ data retransmission frequency and a driving time of the timer T1 of the HARQ module.

Figure 7:
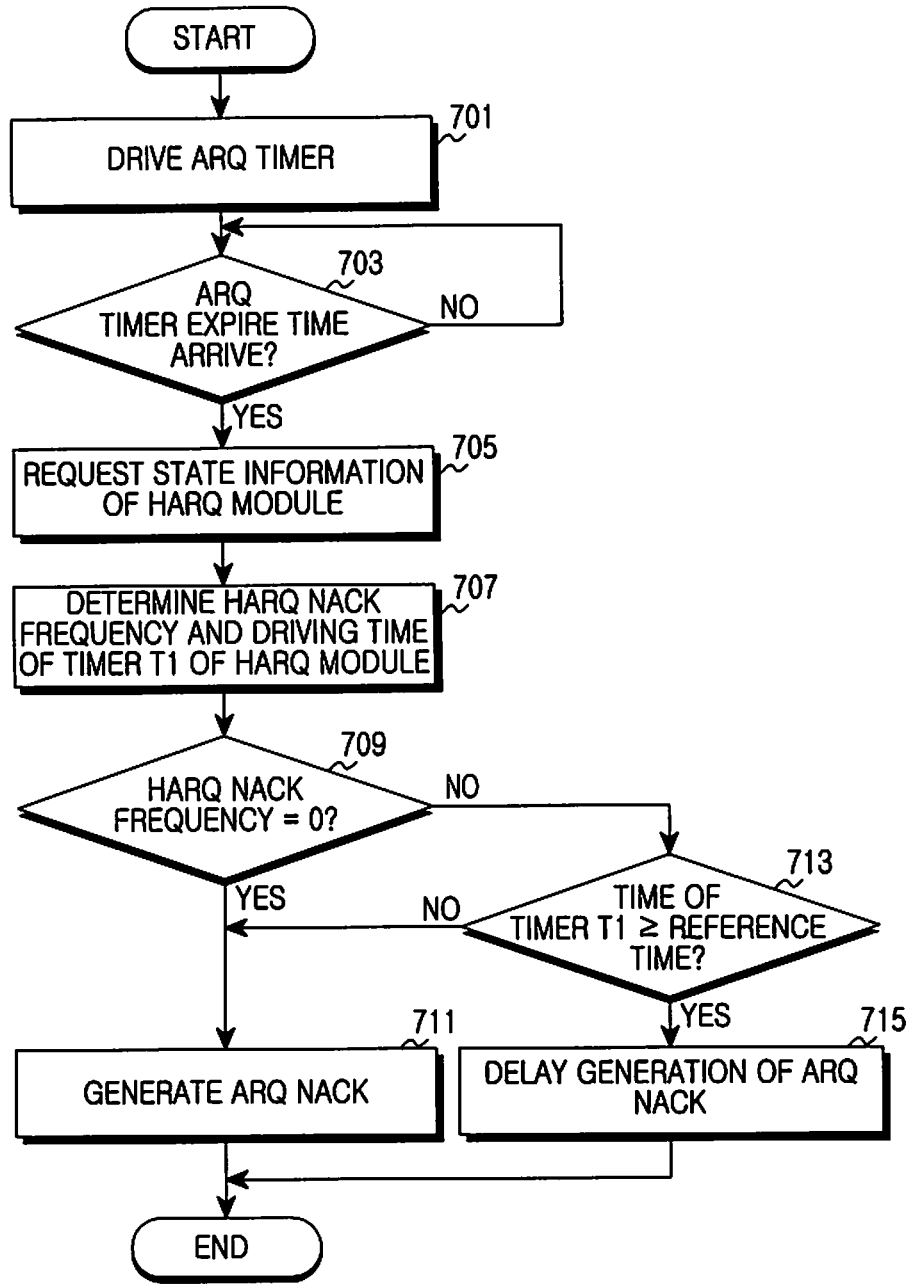
FIG. 7 is a flowchart illustrating a procedure for requesting retransmission of data at an ARQ module of a reception end according to an embodiment of the present invention.

FIG. 7 is a flowchart illustrating a procedure for requesting retransmission of data at an ARQ module of a reception end according to an embodiment of the present invention.

Referring to FIG. 7, when transmitting ARQ ACK/NACK information, the ARQ module of the reception end drives an ARQ timer in step 701.

In step 703, the ARQ module determines whether an expiring time of the ARQ timer arrives.

When the ARQ timer expires, the ARQ module requests an HARQ module of the reception end to transmit operation state information in step 705.

In step 707, the ARQ module determines a data retransmission frequency of the HARQ module and a driving time of a timer T1 of the HARQ module through the operation state information provided from the HARQ module. Here, the ARQ module may determine the data retransmission frequency through a frequency by which the HARQ module has transmitted HARQ NACK information to a transmission end.

After determining the HARQ NACK frequency of the HARQ module, the ARQ module determines whether the HARQ module has performed retransmission of data in step 709.

When the frequency by which the HARQ module has transmitted the HARQ NACK information is 0, the ARQ module determines that the HARQ module has not performed retransmission of data. That is, when the ARQ timer expires, the ARQ module determines that data has not been received due to a problem of the ARQ module, not a problem of the HARQ module. Accordingly, the ARQ module generates ARQ NACK information in step 711.

However, when the frequency by which the HARQ module has transmitted the HARQ NACK information is not 0, the ARQ module compares a driving time of a timer T1 of the HARQ module with a reference time in step 713.

When the driving time of the timer T1 is greater than the reference time, the ARQ module determines that an HARQ retransmission frequency is small and so a probability of receiving relevant data through HARQ retransmission is low. Accordingly, the ARQ module generates ARQ NACK information in step 711.

However, when the driving time of the timer T1 is equal to or less than the reference time, the ARQ module determines that the HARQ retransmission frequency is large and therefore, a probability of receiving relevant data through HARQ retransmission is high. Accordingly, in step 713, the ARQ module delays generation of ARQ NACK information, even when the ARQ timer expires.

For example, the ARQ module may determine a time for delaying the generation of the ARQ NACK information in consideration of a frequency by which the HARQ module has transmitted HARQ NACK information. Alternatively, the ARQ module may determine a time for delaying the generation of the ARQ NACK information in consideration of a driving time of a timer T1 of the HARQ module.

As described above, an ARQ module of a reception end requests a HARQ module of the reception end to transmit operation state information to determine the operation state information of the HARQ module.

In accordance with an embodiment of the present invention, when an ARQ timer expires, an ARQ module of a reception end may also determine operation state information of a HARQ module without requesting the information from the HARQ module of the reception end.

Figure 8:
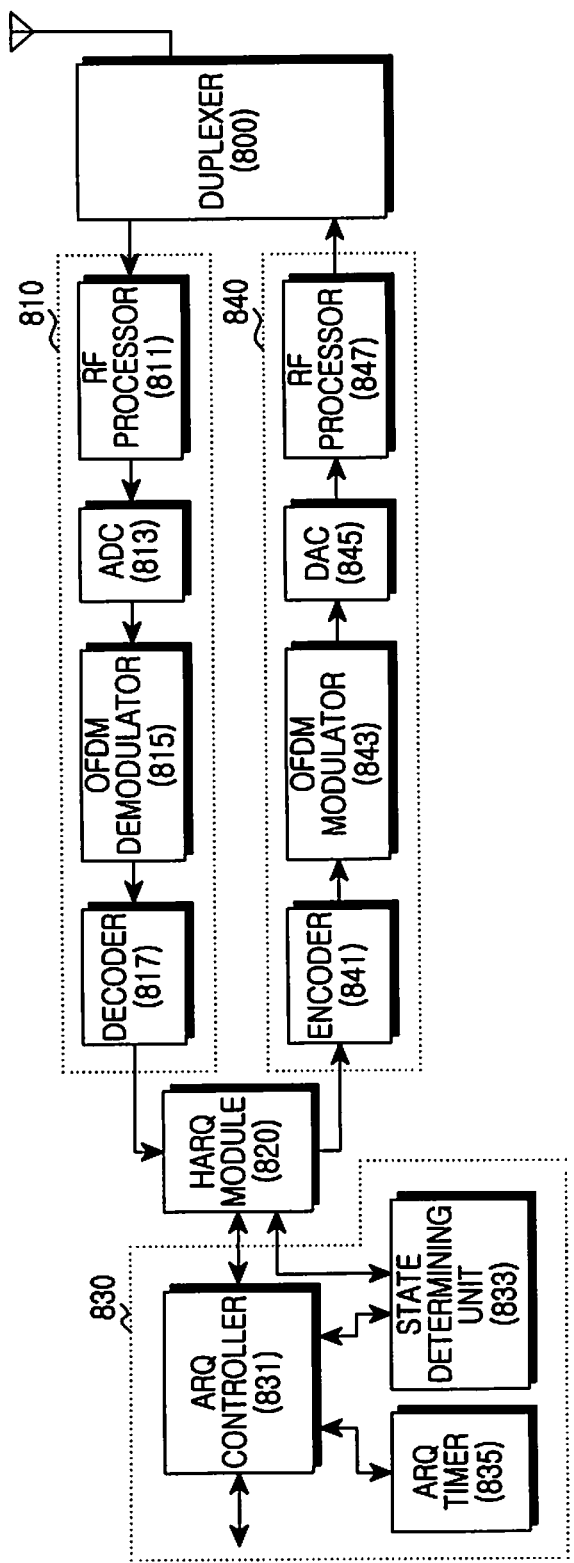
FIG. 8 is a block diagram illustrating a reception end that supports an ARQ and a HARQ according to an embodiment of the present invention.

FIG. 8 is a block diagram illustrating a reception end that supports an ARQ and a HARQ according to an embodiment of the present invention.

Referring to FIG. 8, the reception end includes a duplexer 800, a receiver 810, a HARQ module 820, an ARQ module 830, and a transmitter 840.

The duplexer 800 transmits a transmission signal provided by the transmitter 840 via an antenna, and provides a reception signal from the antenna to the receiver 810 according to a duplexing scheme.

The receiver 810 includes a Radio Frequency (RF) processor 811, an Analog/Digital Converter (ADC) 813, an Orthogonal Frequency Division Multiplexing (OFDM) demodulator 815, and a decoder 817. The RF processor 811 converts an RF signal provided by the duplexer 800 into a baseband analog signal. The ADC 813 converts an analog signal provided by the RF processor 811 into digital sample data. The OFDM demodulator 815 converts sample data in a time domain provided by the ADC 813 into data in a frequency domain by performing Fast Fourier Transform (FFT). The decoder 817 selects data of subcarriers to be actually received from the data in the frequency domain provided by the OFDM demodulator 815. Thereafter, the decoder 817 demodulates and decodes the selected data according to a predetermined Modulation and Coding Scheme (MCS) level.

The HARQ module 820 controls a HARQ operation depending on whether an error is generated for data provided via the receiver 810. When an error is generated for the data provided via the receiver 810, the HARQ module 820 controls HARQ NACK information for the data to be transmitted to a transmission end in order to receive the data for which the error has been generated through retransmission. The HARQ module 820 controls HARQ NACK information in consideration of a HARQ retransmission frequency. When an error is not generated for the data provided via the receiver 810, the HARQ module 820 controls HARQ ACK information for the data to be transmitted to the transmission end. In addition, the HARQ module 820 transmits the data to the ARQ module 830.

The HARQ module 820 includes a timer T1 (not shown), which is driven when the HARQ module receives data of a not in-sequence TSN.

The ARQ module 830 includes an ARQ controller 831, a state determining unit 833, and an ARQ timer 835.

The ARQ controller 831 controls an HARQ operation depending on whether an error is generated for data provided by the HARQ module 820. More specifically, when an error is generated for the data provided by the HARQ module 820, the ARQ controller 831 controls ARQ NACK information for the data to be transmitted to the transmission end in order to receive the data for which the error has been generated through retransmission. The ARQ controller 831 controls the ARQ NACK information in consideration of an ARQ retransmission frequency. When an error is not generated for the data provided by the HARQ module 820, the ARQ controller 831 controls ARQ ACK information for the data to be transmitted to the transmission end. In addition, the ARQ controller 831 transmits the data to an upper layer.

When the ARQ timer 835 expires, the ARQ controller 831 may delay a generation time of ARQ NACK information in consideration of an operation state of the HARQ module 820 provided by the state determining unit 833, as described above. Here, the ARQ controller 831 determines a time for delaying the generation of the ARQ NACK information using at least one of a HARQ data retransmission frequency included in operation state information of the HARQ module 820, an amount of data included in a queue of the HARQ module 820, and a driving time of a timer T1 of the HARQ module 820.

The state determining unit 833 determines an operation state of the HARQ module 820 under control of the ARQ controller 831.

When the ARQ module transmits ARQ ACK/NACK information, the ARQ timer 835 is driven. When the ARQ timer 835 expires, the ARQ timer 835 transmits driving time expiration information to the ARQ controller 831.

The transmitter 840 includes an encoder 841, an OFDM modulator 843, a Digital/Analog Converter (DAC) 845, and an RF processor 847. The encoder 841 encodes and modulates transmission data and a control message according to a relevant MCS level. The OFDM modulator 843 converts data in the frequency domain provided by the encoder 841 into sample data (OFDM symbol) in the time domain by performing Inverse Fast Fourier Transform (IFFT). The DAC 845 converts the sample data provided by the OFDM modulator 843 into an analog signal. The RF processor 847 converts a baseband analog signal provided by the DAC 845 into an RF signal.

The HARQ module 820 and the ARQ module 830 of the reception end include an error checking unit (not shown) for determining whether an error is generated to reception data.

As illustrated in FIG. 8, the ARQ module 830 includes all of the ARQ controller 831, the state determining unit 833, and the ARQ timer 835. However, in accordance with another embodiment of the present invention, the ARQ module 830 may include at least one of the state determining unit 833 and the ARQ timer 835, without the ARQ controller 831.

The apparatuses and the methods according to the above-described embodiments of the present invention improve system throughput and prevent data repetition through retransmission to reduce resource loss by controlling an operation of an ARQ in consideration of an operation state of a HARQ in a wireless communication system.

Although the present invention has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined by the appended claims and the equivalents thereof.

What is claimed is:

1. A method for operating an Automatic Repeat reQuest (ARQ) at a reception end of a wireless communication system, the method comprising:

determining operation state information of a Hybrid Automatic Repeat reQuest (HARQ) module for controlling a HARQ, when an ARQ timer expires;

determining whether to delay generation of Negative ACKnowledge (NACK) information in consideration of the operation state information of the HARQ module; and when determining to delay the generation of the NACK information, delaying the generation of the NACK information for a delay time determined in consideration of the operation state information of the HARQ module.

2. The method of claim 1, wherein the operation state information of the HARQ module includes at least one of a NACK information transmission frequency of the HARQ module, an amount of data stored in a queue of the HARQ module, and a driving time of a timer driven when the HARQ module receives data having a not in-sequence Transport Sequence Number (TSN).

3. The method of claim 1, wherein determining whether to delay the generation of the NACK information comprises:
   determining to delay the generation of the NACK information, when a NACK information transmission frequency of the HARQ module is not 0; and
   determining not to delay the generation of the NACK information, when the NACK information transmission frequency of the HARQ module is 0.

4. The method of claim 1, wherein determining whether to delay the generation of the NACK information comprises:
   determining not to delay the generation of the NACK information, when an amount of data stored in a queue of the HARQ module is less than an amount of reference data; and
   determining to delay the generation of the NACK information, when the amount of the data stored in the queue of the HARQ module is equal to or greater than the amount of the reference data.

5. The method of claim 1, wherein determining whether to delay the generation of the NACK information comprises:
   determining to delay the generation of the NACK information, when a driving time of a timer is less than a reference driving time; and
   determining not to delay the generation of the NACK information, when the driving time of the timer is equal to or greater than the reference driving time,
   wherein the timer is driven when the HARQ module receives data having a not in-sequence TSN.

6. The method of claim 1, wherein determining whether to delay the generation of the NACK information comprises:
   determining to delay the generation of the NACK information, when a NACK information transmission frequency of the HARQ module is not 0 and an amount of data stored in a queue of the HARQ module is equal to or greater than an amount of reference data; and
   determining not to delay the generation of the NACK information, when the NACK information transmission frequency of the HARQ module is 0 or the amount of the data stored in the queue of the HARQ module is less than the amount of the reference data.

7. The method of claim 1, wherein determining whether to delay the generation of the NACK information comprises:
   determining to delay the generation of the NACK information, when a NACK information transmission frequency of the HARQ module is not 0 and a driving time of a timer is less than a reference driving time; and
   determining not to delay the generation of the NACK information, when the NACK information transmission frequency of the HARQ module is 0 or the driving time of the timer is equal to or greater than the reference driving time,
   wherein the timer is driven when the HARQ module receives data having a not in-sequence TSN.

8. The method of claim 1, further comprising:
   determining whether the ARQ timer expires, when determining not to delay the generation of the NACK information; and
   transmitting NACK information of relevant data to a transmission end, when the ARQ timer expires.

9. The method of claim 1, further comprising:
   when receiving data from the HARQ module, determining whether an error is generated for the data; and
   transmitting NACK information of the data to a transmission end, when the error is generated to the data.

10. A reception end apparatus for operating an Automatic Repeat reQuest (ARQ) in a wireless communication system, the apparatus comprising:
    a receiver for receiving data;
    a Hybrid Automatic Repeat reQuest (HARQ) module for controlling a HARQ for data received via the receiver;
    an ARQ timer that is driven when an ARQ module transmits ACKnowledge/Negative ACKnowledge (ACK/NACK) information; and
    the ARQ module for, when the ARQ timer expires, determining whether to delay generation of NACK information in consideration of operation state information of the HARQ module, and when determining to delay the generation of the NACK information, delaying the generation of the NACK information for a delay time determined in consideration of the operation state information of the HARQ module.

11. The apparatus of claim 10, wherein the ARQ module comprises:
    a state determining unit for determining operation state information of the HARQ module including at least one of a NACK information transmission frequency of the HARQ module, an amount of data stored in a queue of the HARQ module, and a driving time of a timer that is driven when the HARQ module receives data having a not in-sequence Transport Sequence Number (TSN); and
    an ARQ controller for controlling an ARQ depending on whether an error is generated for data provided by the HARQ module, and determining whether to delay generation of the NACK information in consideration of the operation state information of the HARQ module determined by the state determining unit.

12. The apparatus of claim 11, wherein the ARQ controller determines to delay the generation of the NACK information, when the NACK information transmission frequency of the HARQ module is not 0, and determines not to delay the generation of the NACK information, when the NACK information transmission frequency of the HARQ module is 0.

13. The apparatus of claim 11, wherein the ARQ controller determines to delay the generation of the NACK information, when the amount of data stored in the queue of the HARQ module is equal to or greater than an amount of reference data, and determines not to delay the generation of the NACK information, when the amount of the data stored in the queue of the HARQ module is less than the amount of the reference data.

14. The apparatus of claim 11, wherein the ARQ controller determines to delay the generation of the NACK information, when the driving time of the timer is less than a reference driving time, and determines not to delay the generation of the NACK information, when the driving time of the timer is equal to or greater than the reference driving time.

15. The apparatus of claim 11, wherein the ARQ controller determines to delay the generation of the NACK information, when the NACK information transmission frequency of the HARQ module is not 0 and the amount of the data stored in the queue of the HARQ module is equal to or greater than an amount of reference data, and determines not to delay the generation of the NACK information, when the NACK information transmission frequency of the HARQ module is 0 or the amount of the data stored in the queue of the HARQ module is less than the amount of the reference data.

16. The apparatus of claim 11, wherein the ARQ controller determines to delay the generation of the NACK information, when the NACK information transmission frequency of the HARQ module is not 0 and the driving time of the timer is less than a reference driving time, and determines not to delay the generation of the NACK information, when the NACK information transmission frequency of the HARQ module is 0 or the driving time of the timer is equal to or greater than the reference driving time.

17. The apparatus of claim 10, wherein when determining not to delay the generation of the NACK information and when the ARQ timer expires, the ARQ module controls NACK information of relevant data to be transmitted to a transmission end.

18. The apparatus of claim 10, wherein when an error is generated for data provided from the HARQ module, the ARQ module controls NACK information of relevant data to be transmitted to a transmission end.

* * * * *